US005690136A

United States Patent [19]

Celli

[11] Patent Number: 5,690,136

[45] Date of Patent: Nov. 25, 1997

[54] DEVICE FOR RAPID CONNECTING-UP OF PRESSURIZED CONTAINERS IN DRINKS DISPENSER PLANTS

[75] Inventor: Goffredo Celli, Coriano, Italy

[73] Assignee: Celli, S.p.A., Coriano, Italy

[21] Appl. No.: 656,520

[22] Filed: May 31, 1996

[30] Foreign Application Priority Data

May 31, 1995 [EP] European Pat. Off. .............. 95830232

[51] Int. Cl.[6] ............................ B65D 57/54; F16K 31/54

[52] U.S. Cl. ....................... 137/212; 137/323; 222/400.7; 251/229; 251/250

[58] Field of Search .................................... 137/321, 322, 137/323, 212; 222/400.7; 251/58, 229, 250, 358

[56] References Cited

U.S. PATENT DOCUMENTS

| | | | |
|---|---|---|---|
| 689,338 | 12/1901 | Wendt | 137/323 |
| 3,272,404 | 9/1966 | Graves | 222/400.7 |
| 3,806,082 | 4/1974 | Kellner | 251/62 |
| 4,422,618 | 12/1983 | Lawson | 251/58 |
| 4,721,132 | 1/1988 | Houlgrave | 251/250 |

FOREIGN PATENT DOCUMENTS

| | | | |
|---|---|---|---|
| 0 61 48 51 | 9/1994 | European Pat. Off. . | |
| 0614851 | 9/1994 | European Pat. Off. | 222/400.7 |
| 106318 | 10/1898 | Germany | 137/323 |
| 78 06 76 1 | 12/1979 | Netherlands . | |

*Primary Examiner*—George L. Walton
*Attorney, Agent, or Firm*—Dvorak & Orum

[57] ABSTRACT

A drink dispenser includes a body of a head of the device having a cavity that defines a three-way passageway, the cavity containing a tubular element which is slidably movable along an axial direction of the tubular element between a first and second end run position. The tubular element includes a lateral wall that is placed against the first passageway so that the drink can flow from the second passageway into a third passageway. The tubular element is mechanically interconnected by rack-and-pinion links contained in the body to a drink intercept valve having an obturator and a valve seat, with the obturator being rotatable relative to the valve seat so that the drink can flow between the third passageway and into a drink delivery line. Actuation of a single command lever connected to the tubular element and the obturator causes the tubular element to slidably move between the end run positions, which in turn causes movement of the rack and pinion links and an opening and closing of the drink intercept valve.

19 Claims, 2 Drawing Sheets

DEVICE FOR RAPID CONNECTING-UP OF PRESSURIZED CONTAINERS IN DRINKS DISPENSER PLANTS

BACKGROUND OF THE INVENTION

In particular the invention relates to beer dispensing plants, to which the following description makes reference, without however intending to be exclusive; in other words the scope of the invention includes rapid connection devices for all kinds of drinks where gas is injected into said drink container to force out the drink.

In the field of beer dispensing containers, rapid connection devices have the aim of allowing a fast substitution of empty containers, or kegs, as they are commonly known, so that supply of beer to a tap through a beer delivery line and a gas feed line, which injects gas into the container and gives it its characteristic foamy appearance, can be quickly re-established.

This keg-substitution operation, in order to be correctly carried out, before the connection device is detached from the keg, first requires that the beer delivery line and the gas feed line be stopped so as to avoid loss of either fluid as well as not to cause problems at the tap end and/loss of foaminess in the beer itself.

Document NL 7806761 discloses a connection device which substantially comprises two independent intercept valves, one for the drink line and the other for the gas line.

The drink intercept valve is provided with a floating obturator in the delivery tube which can be actuated by the flow of the drink itself, such as to allow free transit to the beer when it is forced towards the delivery line, and impeding any backflush towards the keg when detached, or, more in general, when the gas is not at a sufficient pressure.

The gas intercept valve comprises a valve head affording a three-way internal cavity in which a tubular element is housed in such a way as to be crossed by the drink, placing in communication two opposite ways while opposing, with a lateral wall thereof, passage of the gas through a third way, thus functioning as an intercept element of said gas.

The tubular element is slidably mobile in an axial direction with respect to the housing cavity, by activation of a lever between two extreme positions, whereof a first affords free passage to the gas feed into the keg, whereof a second intercepts said gas, which latter position can be exploited when an empty keg has to be removed.

The presence of the floating obturator on the drink delivery line causes a certain delay in interception of the beer with respect to interception of the gas.

This characteristic does not permit rapid substitution of the keg, and what is more, the seal of the floating obturator is considerably unsafe, so that substitution of a keg is always accompanied by a spillage of beer and by a necessary at-least partial disconnection of the delivery pipe, with the attendant problems as described above.

To obviate these drawbacks a device belonging to the same applicant (European Patent Application no. 93830091.0) was realized, the principal characteristics of which are recited in the preamble to claim 1 hereinbelow. In this device, the delivery line was intercepted by means of a valve provided with an obturator which is rotatable on a specially-shaped seating mechanically connected to the tubular element such as to synchronize interception of the drink with interception of the gas by operating a single two-way command lever.

The above device allowed for rapid substitution of the beer kegs with perfect stopping of the drink delivery line, but the lever-operated mechanical connection, though mechanically secure and efficient, was rather large, unwieldy and prone to being accidentally yanked or knocked, especially as a typical housing for drinks kegs is fairly small.

SUMMARY OF THE INVENTION

The main aim of the present invention, as it is characterized in the claims that follow, is to eliminate the above-mentioned drawbacks and solve the problem of mechanically connecting the intercept valve of the drink delivery line with the tubular gas intercept element, mechanisms which are completely contained the body of the device head.

The mechanisms comprise a couple of mechanically connected elements (preferably of the rack-and-pinion type), respectively associated to the rotatable obturator of the valve and to the tubular element such as to rotate the obturator in its seat in coordination with the translation of the tubular element, such as contemporaneously to using within intercept drink delivery and gas infeed, all by operating on one command lever only.

The above-mentioned mechanisms are housed internally of specially-shaped shells borne on the body of the head which, since it permits a total segregation of the actuating elements of the mechanical link connections, enables the operator to substitute the beer keg comfortably and without any danger of accident or injury.

The shell conformation is such that they can be associated with the body of the head, with the body of the beer delivery intercept valve, with the command lever and finally with the component elements of the mechanism itself, all through geometrical constraints alone.

This characteristic allows for manual mounting and removal of the entire device very quickly and without having recourse to large numbers of tools (and the tools needed are of very common types); obviously the resultant production and maintenance costs are correspondingly contained.

BRIEF DESCRIPTION OF THE DRAWINGS

Further characteristics and advantages of the present invention will better emerge from the detailed description that follows, of an embodiment of the invention, illustrated in the form of a non-limiting example in the accompanying drawings, in which.

DESCRIPTION OF THE PREFERRED EMBODIMENTS

Figure 1:
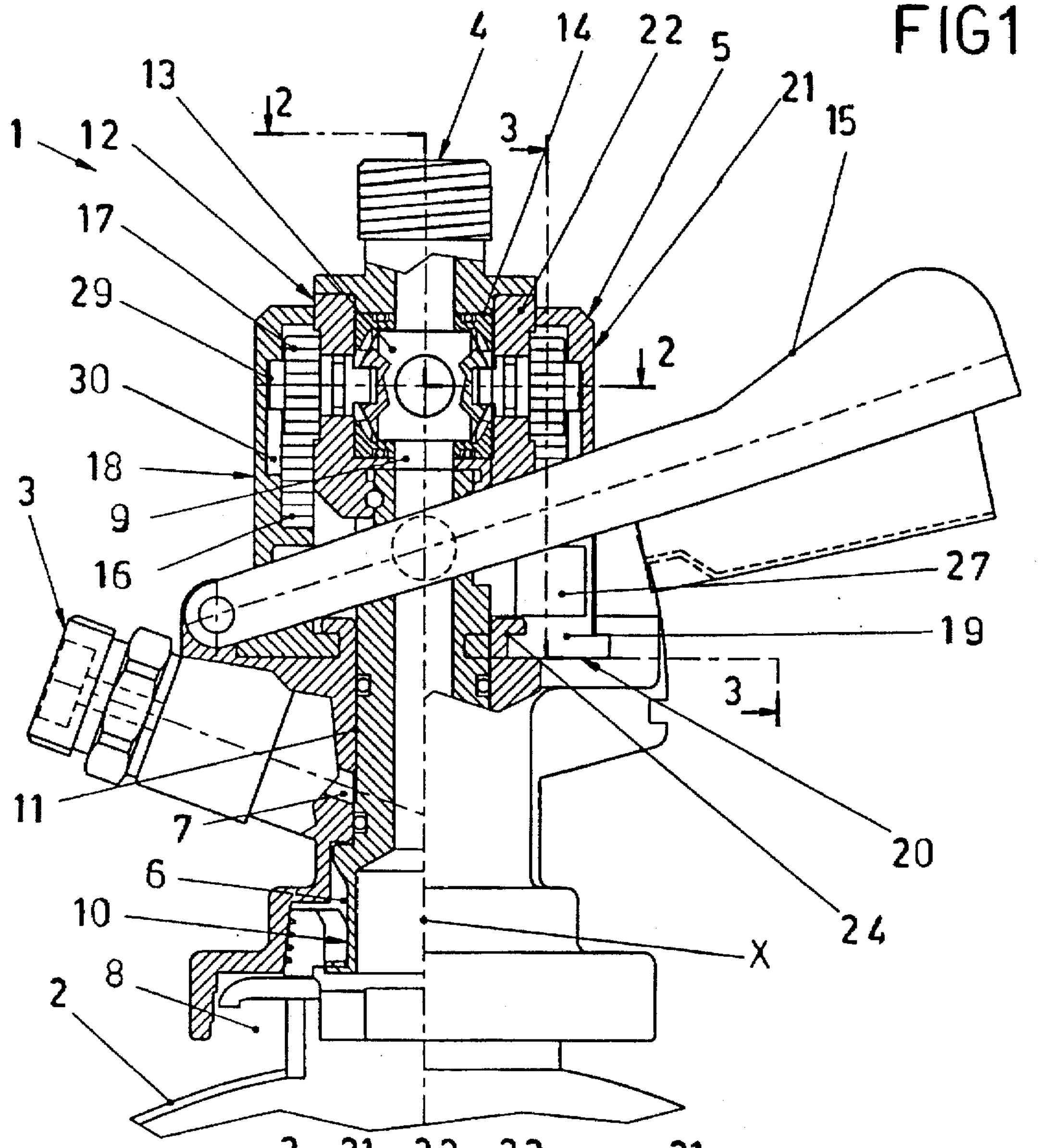
FIG. 1 is a partly-sectioned perspective view of the entire device, shown in a configuration in which it is intercepting the drink delivery and gas introduction.
Figure 2:
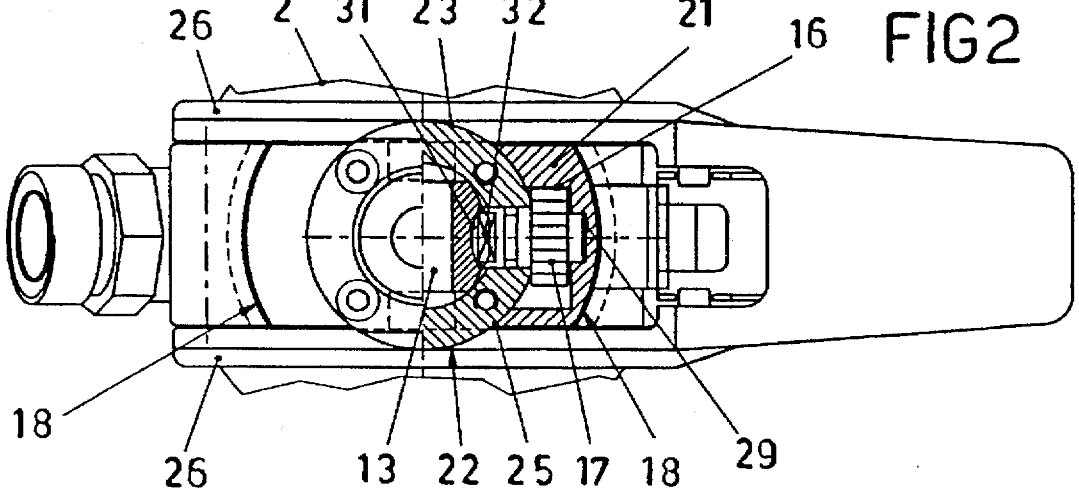
FIG. 2 is a plan view of the device of FIG. 1 seen from above and partly sectioned according to line 2—2 thereof.
Figures 3, 4, 5, 6, 7:
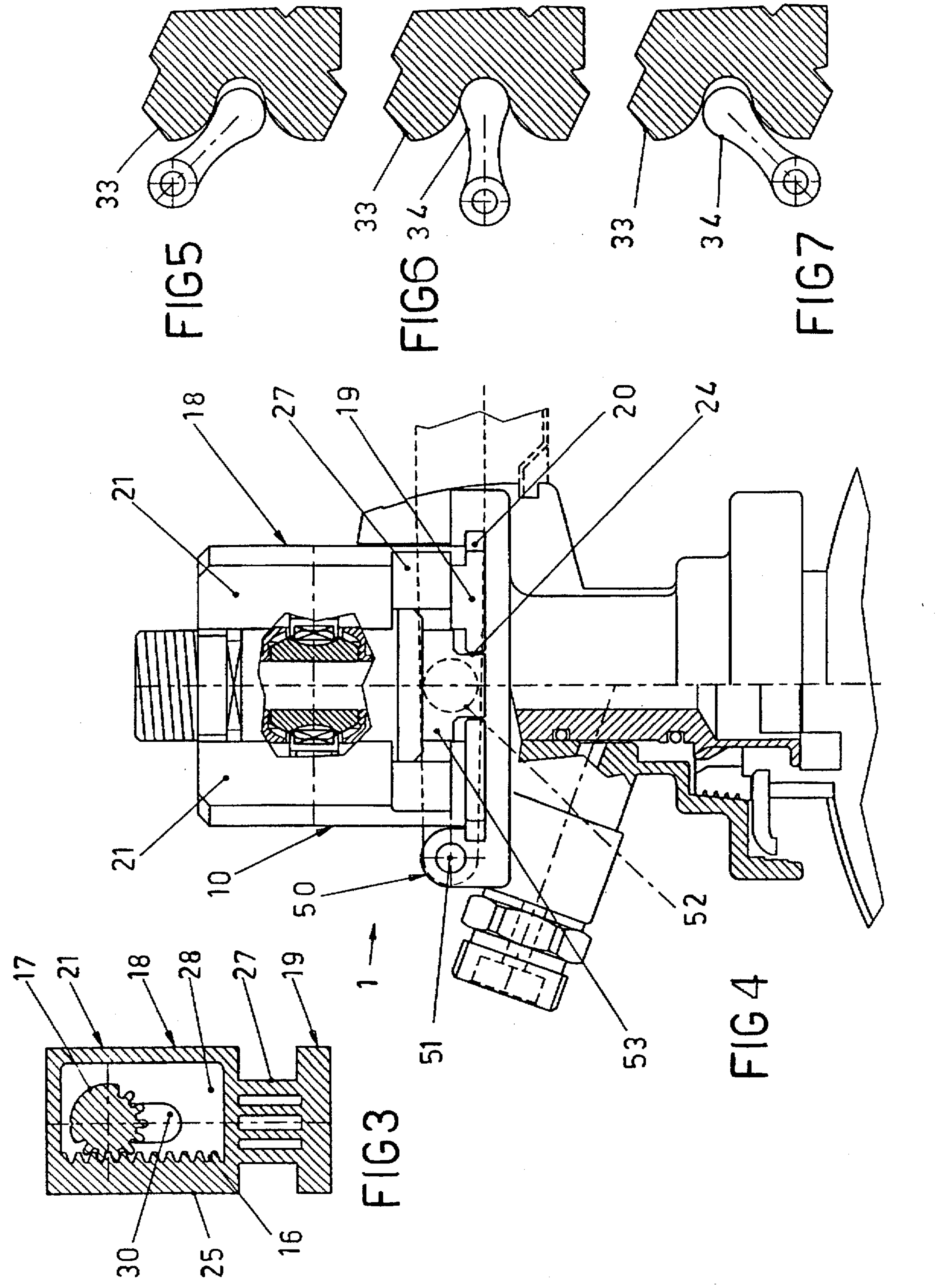
FIG. 3 is a section of the device according to line 3—3 of FIG. 1.
FIG. 4 is a perspective view of the device in its entirety, shown in an operative condition wherein the drink delivery and gas introduction are both open.
FIGS. 5, 6 and 7 show a further embodiment of a detail of the invention, shown in some significant operative positions.

With reference to the figures of the drawings, and in particular to FIGS. 1 and 4, the device essentially consists in a rapid connection device 1, for use in drinks dispensing plants, and to a pressurized keg 2 with a gas introduction line 3 (usually carbon dioxide) and a drink delivery line 4.

The device 1 essentially comprises: a body 5 of the device head internally affording a cavity 6 containing a tubular element 10 and a drink intercept valve 12, as well as a single two-way command lever 15.

The cavity 6 is conformed such as to present three ways 7, 8 and 9 which are respectively associable to the gas introduction line 3, to the beer keg 2 and to the drink delivery line 4.

The tubular element 10 is arranged in the cavity 6 alignedly with the drink delivery line 4 and the keg 2 such that the beer can run through it while at the same time a lateral wall 11 of said tubular element 10 is placed in contact with the gas introduction line 7. Said tubular element 10 is further associated to the cavity 6 such as to be slidably mobile therein along an axial direction X of said tubular element 10 between two endrun positions, in one whereof the lateral wall 11 intercepts the gas, while in another whereof the gas can flow freely towards the keg 2.

The drink intercept valve 12 is fixed to the tubular element 10 such as to be translatable together therewith with respect to the body 5 of the head. It comprises an obturator 13 which is rotatable in a shaped seating 14, which obturator 13 is mechanically interconnected to the tubular element 10 by means of two mechanisms contained internally of the body 5, bilaterally of the obturator 13 and comprising a couple of mechanically linked elements such as to be reciprocally roto-translatable, causing rotation of the obturator 13 whenever the tubular element 10 is made to translate along the cavity 6 containing it, by activation of the lever 15, as will better emerge hereinafter.

Preferably, and for easy mounting (as will better emerge hereinafter), the drink intercept valve 12 is provided with an obturator covering body 22 having a shaped external surface 23, preferably cylindrical and coaxial with the direction of the axis X of the body 5.

In a first embodiment a first element of the above-described mechanism is represented by a rack 16 borne on the head 5 and arranged parallel to the axis X direction of the internal cavity 6, while a second element comprises a cogwheel 17 made solid on the obturator 13 which, rotating on the rack 16, rotates the obturator 13 with respect to the seating 14 consequent to the movement caused on the tubular element 10.

In an alternative embodiment (illustrated in FIGS. 5, 6 and 7), the mechanically connected elements can also be realized as follows: a base 33 is arranged parallel to the axis X direction of the cavity 6 of the body 5 and fixed to said body, and by a cam 34 designed such as to roto-translate on the base 33 solidly with the obturator 13 of the drink intercept valve 12.

It should be underlined that the two above-described mechanisms are only two examples of and should not be taken as limiting in any way; in fact, the movements of the obturator 13 and the tubular element 10 can be correlated in other ways which are mechanically equivalent.

From the figures it can also be seen that the body 5 exhibits, in a preferred embodiment, two halves of a shell 18 for containing the mechanisms, removably associated with the body 5 and embodiments comprising a rest base 19 and a shaped head 21. The base 19 is shaped such as to engage in a cavity 20 on the body 5, while the head 21 is shaped complementarily to the surface 23 of the case 22 containing the obturator 13 such as to be associable to said surface 23 with a surface contact there-between permitting the drink intercept valve 12 to slide with respect to the fixed shell 18.

In more detail, the base 19 and the head 21 exhibit surfaces 24, 25 for coupling with the body 5 and the case 22 of the obturator 13; these surfaces 24, 25 are cylindrical and concentric with respect to the axis X direction oriented for the slidable mounting of the halves of the shell 18 on the body 5 which sliding in substantially transversal to the axis direction X. In this way the mounting of the halves of the shell 18 on the body 5 is effected through a rotation movement about the axis direction X starting from an position in which the halves of the shell 18 associate with their halves of the head 21 to the case 22, while the base 19 is free up until it reaches an angularly rotated position with respect to the preceding in which the base 19 engages in the cavity 20 of the body 5, blocking the shells 18 according to axis direction X.

Further, the halves of the shell 13 comprise a narrow section, or neck 27, arranged between the base 19 and the head 21, which neck 27, should the lever 15 be provided with two tines 26, can advantageously be used for associating therewith such as to prevent the halves of the shell 18 from moving on the body 5 in a transversal direction to that of the axis X.

FIG. 3 shows clearly how, in a preferred embodiment, the halves of the shell 18 exhibit a seating 28 for containing cogwheels 17 of the above-mentioned rack-and-pinion 16, 17 mechanism. The seating 28 is provided with a guide 30 which is parallel to the axis X direction, for translating the rotating pivot 29 of the cogwheels 17 following a translation received from the tubular element 10. The seating 28 also incorporates the rack 16 on which the cogwheels 17 engage.

It can be seen that the conformation of the halves of the shell 18 allows for very simple mounting of the mechanism and indeed the whole device 1.

Starting from a situation where the cogwheels 17 are mounted on the obturator 13, the head 21 bearing the rack 16 associate to the cogwheels 17 by moving the shell 18 side-by-side of the case 22 of the drink intercept valve 12 transversely axis X direction; after which the shell 18 rotated about said axis X direction, bringing into an operative position on the body 5.

The lever 15 is mounted at this point, being slid on the neck 27 of the shell 18 up until it associates at the end 50 of the tines 26 with the body 5; it is there-fixed by insertion of a hinge pivot 51. Centrally of the tines 26 the lever 15 is provided with cylindrical appendages 52 which associate with a channel 53 afforded circumferentially on the tubular element 10 such as to raise or lower the tubular element 10 in the cavity 6, into the operative positions of the lever 15, while at the same time the obturator 13 of the drink intercept valve 12 is rotated.

Finally, the cogwheels 17 are made in such a way as to enable the pivot 29 to be removable from the obturator 13; this can be done for example by realizing a cavity 31 and a square pivot 29 which are reciprocally engageable and conformed such that the obturator 13 and the pivot 29 are disengageable but solid in rotation. Thus the device 1 is completely manually mountable, and so practically without need for tools.

What is claimed is:

1. A device for rapid connecting-up of drink containers in drinks dispenser plants provided with a gas introduction line and a drink delivery line, comprising:

a body of a head of the device having a cavity defining a three-way passageway, a first passageway is connectable to the gas introduction line, a second passageway connectable to the container and a third passageway connectable to the drink delivery line;

a tubular element having a lateral wall and arranged in the cavity of the body such that the drink can flow from the second passageway into the third passageway while placing said lateral wall of said tubular element against the first passageway, said tubular element being associated with said cavity such as to be slidable along an axial direction thereof between a first and a second end run position, in one position the lateral wall prevents the introduction of a gas medium into a drink container, while in another position the gas can flow the second passageway and into the drink container, thereby forcing the drink from the drink container through the third passageway and into the drink delivery line;

a drink intercept valve including a valve seat and an obturator, which said obturator is provided within said cavity of said body and rotatable relative to said valve seat for preventing said drink from flowing between the third passageway and the delivery line, which obturator is connected with said tubular element;

a two-way command lever operatively connected with both said tubular element and said obturator;

at least one mechanical link for interconnection of said obturator with said tubular element, said mechanical link contained internally of said body and comprising at least two elements which are each kinematically interconnected so as to be reciprocally roto-translatable within a portion of said body adjacent the tubular element, said first element being arranged parallel to said axial direction of said tubular element, said second element being rotatable along said first element and enmeshed with said obturator within said body adjacent said tubular element so as to impress thereon a rotation of said obturator, which rotation is correlated with a movement of said tubular element and said first and second elements by the actuation of said command lever, whereby such actuation defines said end run positions.

2. A device as in claim 1, wherein said drink intercept valve is solidly constrained to said tubular element and is translatable together therewith with respect to said body, said first element comprising a rack borne on said body, said second element comprising a cogwheel which is solidly constrained to said obturator and rotates on said rack.

3. A device as in claim 1, wherein said mechanically-linked elements comprise a base arranged parallel to said axial direction and a cam which can roto-translate solidly with the obturator such as to impress a rotation thereon with respect to the valve seat which rotation correlates with a movement of the tubular element.

4. A device as in claim 2, wherein said mechanically-linked elements comprise a base arranged parallel to said axial direction and a cam which can roto-translate solidly with the obturator such as to impress a rotation thereon with respect to the valve seat which rotation correlates with a movement of the tubular element.

5. A device as in claim 1, comprising two said mechanical links arranged bilaterally of said obturator.

6. A device as in claim 1, wherein said body comprises at least one shell for containing a said mechanical link.

7. A device as in claim 6, characterized in that said at least one shell or each of said at least one shell is removably associated with said body.

8. A device as in claim 7, wherein said at least one shell comprises a base shaped such as to engage in a specially-shaped cavity afforded on said body.

9. A device as in claim 8, wherein said drink intercept valve exhibits a case for containing the obturator, which case has a shaped external surface, said at least one shell comprising a head shaped complementarily to said surface such as to be contactingly associable thereto.

10. A device as in claim 9, wherein said drink intercept valve is slidably mounted on at least one of said at least one shell.

11. A device as in claim 8, wherein said rest and said head exhibit surfaces for coupling with said body and with said case for containing the obturator, which surfaces are predisposed for mounting of the at least one shell by means of sliding the shell transversely to said axial direction.

12. A device as in claim 9, wherein said rest and said head exhibit surfaces for coupling with said body and with said case for containing the obturator, which surfaces are predisposed for mounting of the at least one shell by means of sliding the shell transversely to said axial direction.

13. A device as in claim 11, wherein said at least one shell comprises a neck arranged between said base and said head, said neck being associable to said lever to prevent transversal movement of said at least one shell with respect to said body and with respect to said axial direction.

14. A device as in claim 12, wherein said at least one shell comprises a neck arranged between said base and said head, said neck being associable to said lever to prevent transversal movement of said at least one shell with respect to said body and with respect to said axial direction.

15. A device as in claim 13, wherein said lever comprises two tines which are associable one each side of said neck.

16. A device as in claim 6 comprising two of said at least one shell for containing said mechanical links bilaterally of said drink intercept valve.

17. A device as in claim 1, wherein said body comprises at least one of said at least one shell having a seating for containing a cogwheel being part of a rack-and-pinion mechanical link operating between said obturator and said tubular element, said seating having a guide for a pivot of said cogwheel and bearing said rack on which said cogwheel is roto-translatably mounted.

18. A device as in claim 6, wherein said base and said head exhibit surfaces for coupling with said body and with said case, which surfaces are concentric with said axial direction, said surfaces enabling said at least one shell to be mounted by sliding on the body by a rotation movement about said axial direction, starting from a position in which said at least one shell is associated by the head thereof to the case while the rest is free, up until reaching a position whereat it is angularly rotated with respect to a previous position, in which position said base engages in the cavity of said body, blocking the at least one shell according to said axial direction.

19. A device as in claim 17, wherein said cogwheel is removably mounted on said obturator.

* * * * *